(12) United States Patent
Fukatsu et al.

(10) Patent No.: US 9,623,918 B2
(45) Date of Patent: Apr. 18, 2017

(54) INDUSTRIAL VEHICLE

(71) Applicant: KABUSHIKI KAISHA TOYOTA JIDOSHOKKI, Kariya-shi, Aichi-ken (JP)

(72) Inventors: Fumihiro Fukatsu, Aichi-ken (JP); Takaaki Takenaka, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 15/014,511

(22) Filed: Feb. 3, 2016

(65) Prior Publication Data

US 2016/0221616 A1 Aug. 4, 2016

(30) Foreign Application Priority Data

Feb. 4, 2015 (JP) .................................. 2015-020141

(51) Int. Cl.
| B62D 49/08 | (2006.01) |
|---|---|
| B66F 9/075 | (2006.01) |
| E02F 9/18 | (2006.01) |

(52) U.S. Cl.
CPC ........ B62D 49/085 (2013.01); B66F 9/07554 (2013.01); E02F 9/18 (2013.01)

(58) Field of Classification Search
CPC .................................................. B62D 49/085
USPC ........................................ 280/755, 758, 759
See application file for complete search history.

(56) References Cited

U.S. PATENT DOCUMENTS

| 3,061,034 | A | | 10/1962 | Hoyt | |
|---|---|---|---|---|---|
| 4,029,340 | A | | 6/1977 | Chelin | |
| 4,580,811 | A | * | 4/1986 | Wykhuis | B62D 49/085 |
| | | | | | 280/759 |
| 6,471,245 | B1 | * | 10/2002 | Schott | B62D 49/085 |
| | | | | | 280/759 |
| 7,896,178 | B2 | * | 3/2011 | Davis | B66C 23/36 |
| | | | | | 212/178 |
| 2005/0012314 | A1 | * | 1/2005 | Kubo | B62D 49/085 |
| | | | | | 280/757 |
| 2008/0129028 | A1 | * | 6/2008 | Hamm | B62D 49/085 |
| | | | | | 280/759 |
| 2009/0043461 | A1 | * | 2/2009 | Bordini | B62D 49/085 |
| | | | | | 701/50 |
| 2013/0343853 | A1 | * | 12/2013 | Sato | E02F 9/0866 |
| | | | | | 414/719 |

FOREIGN PATENT DOCUMENTS

| DE | 2658696 A1 | 6/1978 |
|---|---|---|
| JP | 2006177118 A | 7/2006 |
| JP | 5066872 B2 | 8/2012 |

OTHER PUBLICATIONS

Communication dated Jul. 4, 2016, from the European Patent Office in counterpart European application No. 16152876.5.

* cited by examiner

*Primary Examiner* — Faye M Fleming
(74) *Attorney, Agent, or Firm* — Sughrue Mion, PLLC

(57) ABSTRACT

There is provided an industrial vehicle including a frame and a counterweight connected to a rear part of the frame. The frame includes a frame body and an upright wall that extends upward from the frame body. The counterweight is fastened to the upright wall by a bolt. The counterweight has an engaging portion to cover part of the upright wall and engage with the upright wall.

2 Claims, 11 Drawing Sheets

INDUSTRIAL VEHICLE

BACKGROUND OF THE INVENTION

The present invention relates to an industrial vehicle.

Japanese Patent No. 5066872 discloses a forklift truck as an industrial vehicle. The forklift truck includes a frame extending in the front and rear direction thereof and a counterweight connected to the rear part of the frame. The frame includes a front frame that is made by welding a plurality of steel parts, and a rear frame that is made of casting. The rear frame is fastened to the rear part of the front frame by bolts into an integral structure. The counterweight is fastened to the rear part of the rear frame by bolts.

In this forklift truck, the counterweight of the different weights may be selected as required. This structure helps to promote common use of frames, which permits production of a plurality of forklift truck models having different carrying capacities at a low cost.

However, since the counterweight is a heavy part of the vehicle, it is difficult to position the counterweight correctly relative to the frame before fastening the counterweight to the frame by bolts. Thus, the fastening operation is troublesome and time consuming. For correct positioning of the counterweight, a special tool may be used. In this case, the dedicated tool needs to be used during the operation of fastening the counterweight. Therefore, it is hard to improve the productivity in manufacturing of industrial vehicles and difficult to reduce their cost.

The present invention which has been made in light to the above problems is directed to providing an industrial vehicle that improves the productivity and reduces the manufacturing cost.

SUMMARY OF THE INVENTION

In accordance with one aspect of the present invention, there is provided an industrial vehicle including a frame and a counterweight connected to a rear part of the frame. The frame includes a frame body and an upright wall that extends upward from the frame body. The counterweight is fastened to the upright wall by a bolt. The counterweight has an engaging portion to cover part of the upright wall and engage with the upright wall.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe a towing tractor according to an embodiment of the present invention with reference to FIGS. 1 through 11.

Figure 1:
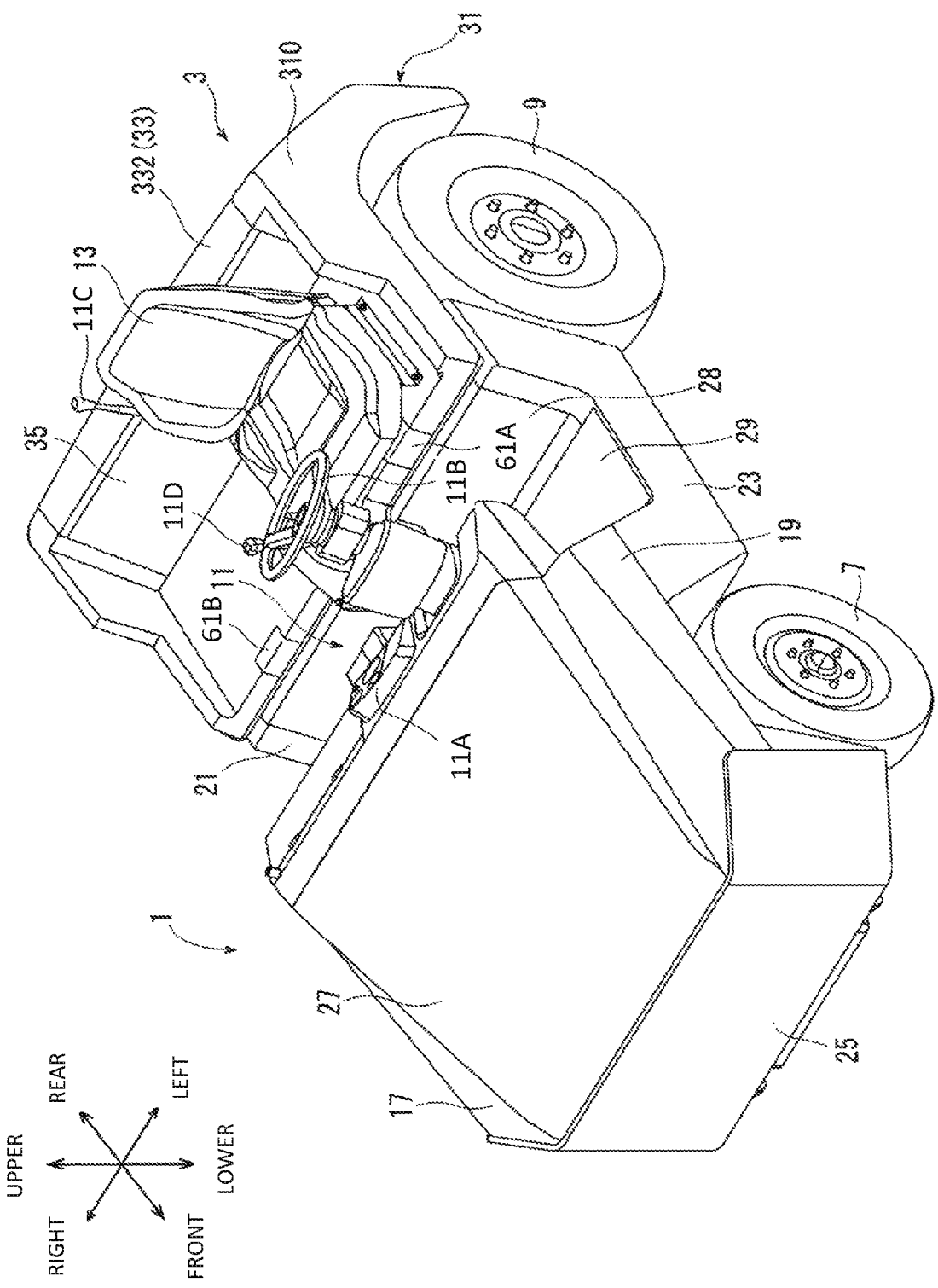
FIG. 1 is a perspective view of an industrial vehicle according to an embodiment of the present invention.
Figure 2:
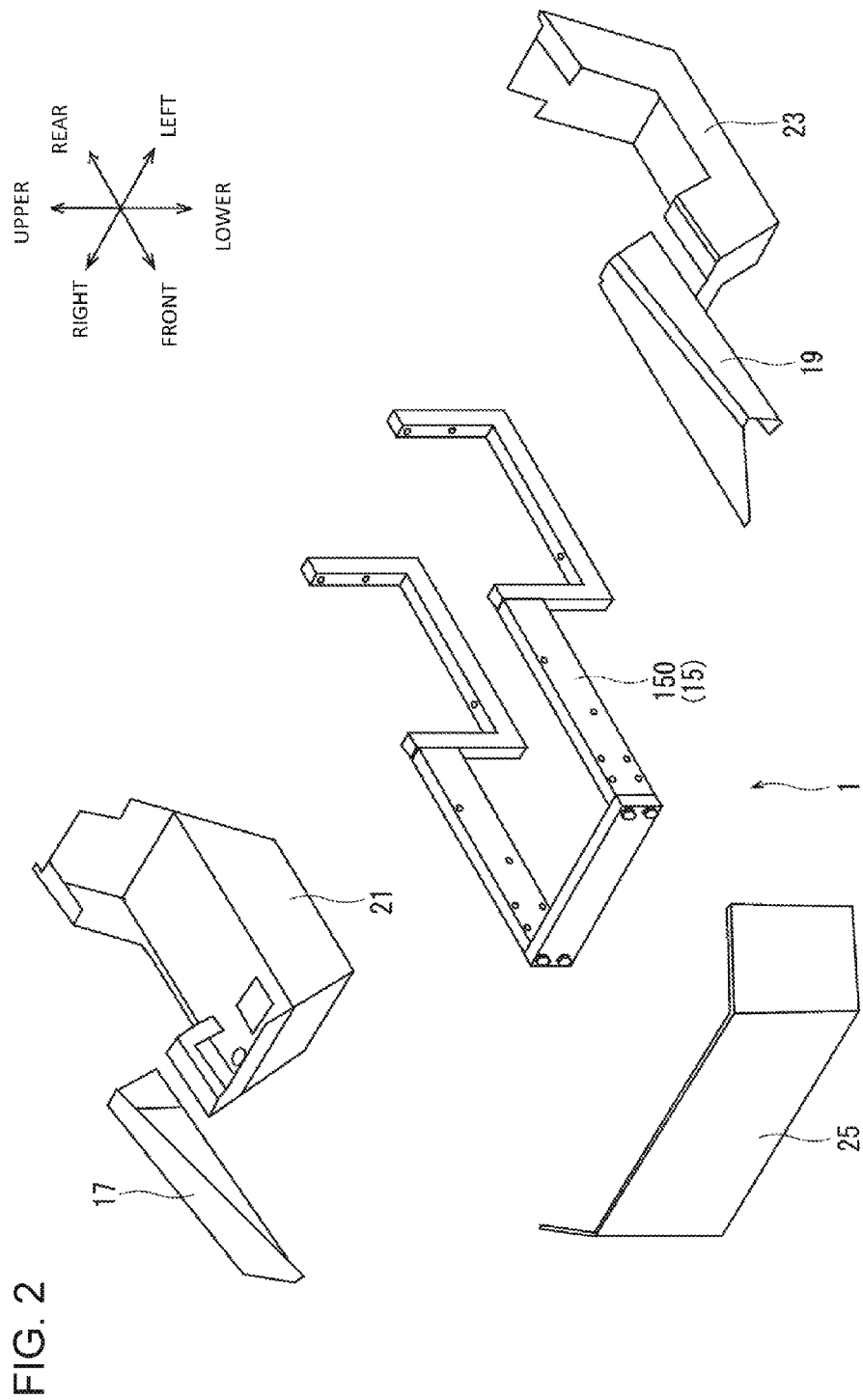
FIG. 2 is an exploded perspective view showing a frame body, fender panels and so on of the industrial vehicle of FIG. 1.
Figure 3:
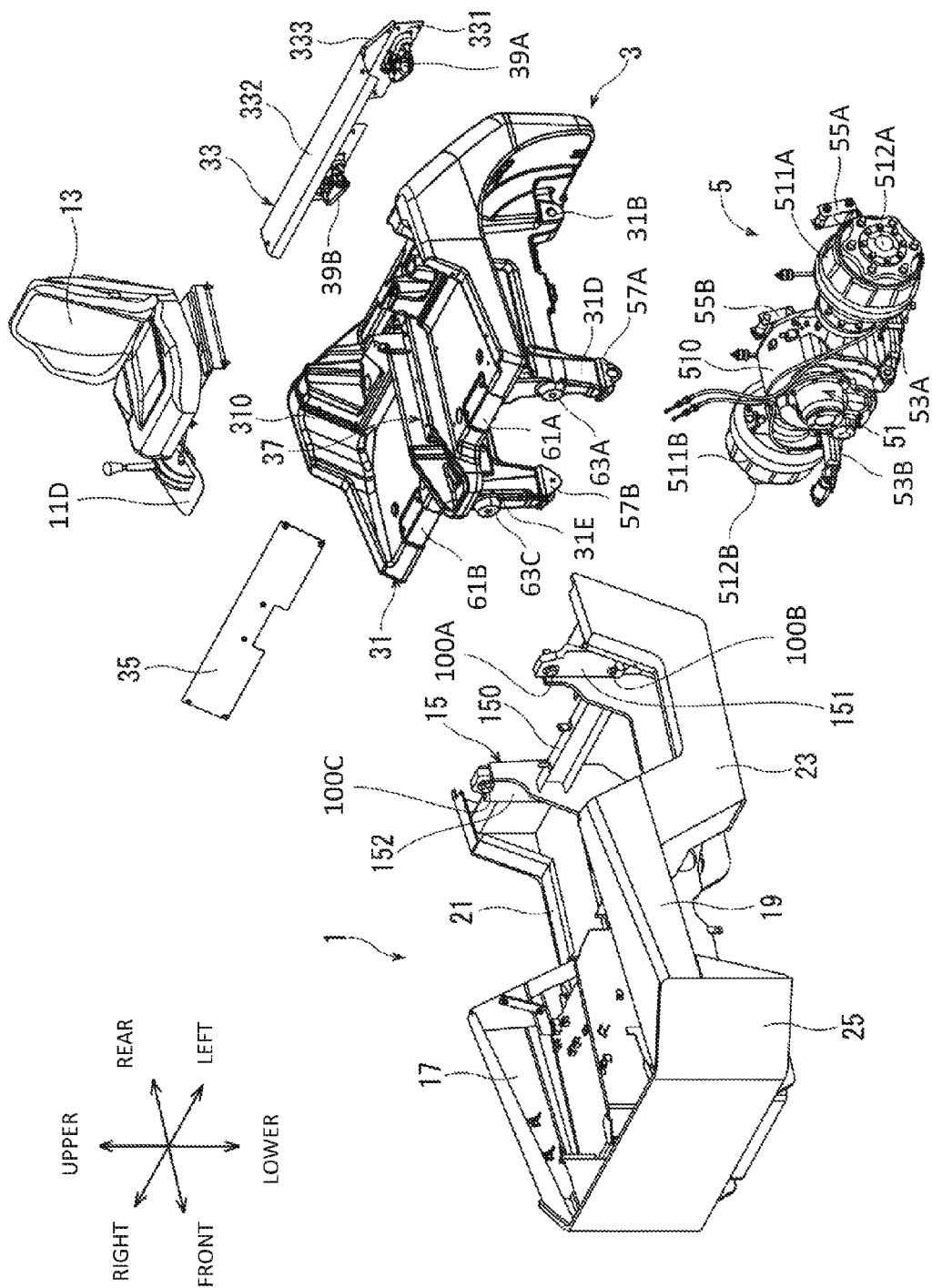
FIG. 3 is an exploded perspective view of the industrial vehicle of FIG. 1.

Referring to FIGS. 1 through 3, the towing tractor according to the present embodiment includes a vehicle body 1, a counterweight 3, a drive device 5, a pair of front wheels 7, a pair of rear wheels 9, a controller 11, and a driver seat 13. Three double-headed arrows in FIG. 1 indicate various positions and directions of the vehicle body 1 of the towing tractor. Specifically, a front wheel 7 and a rear wheel 9 are provided on the left side of the towing tractor, though not shown in the drawing, similar front and rear wheels 7, 9 are provided on the opposite right side of the towing tractor. Additionally, the counterweight 3 is provided on the rear side of the vehicle body 1 that is opposite from a front guard that is provided on the front side of the vehicle body 1. Vertical double-headed arrow indicates upper and lower sides. The same is true for FIGS. 2 through 11.

Figure 4:
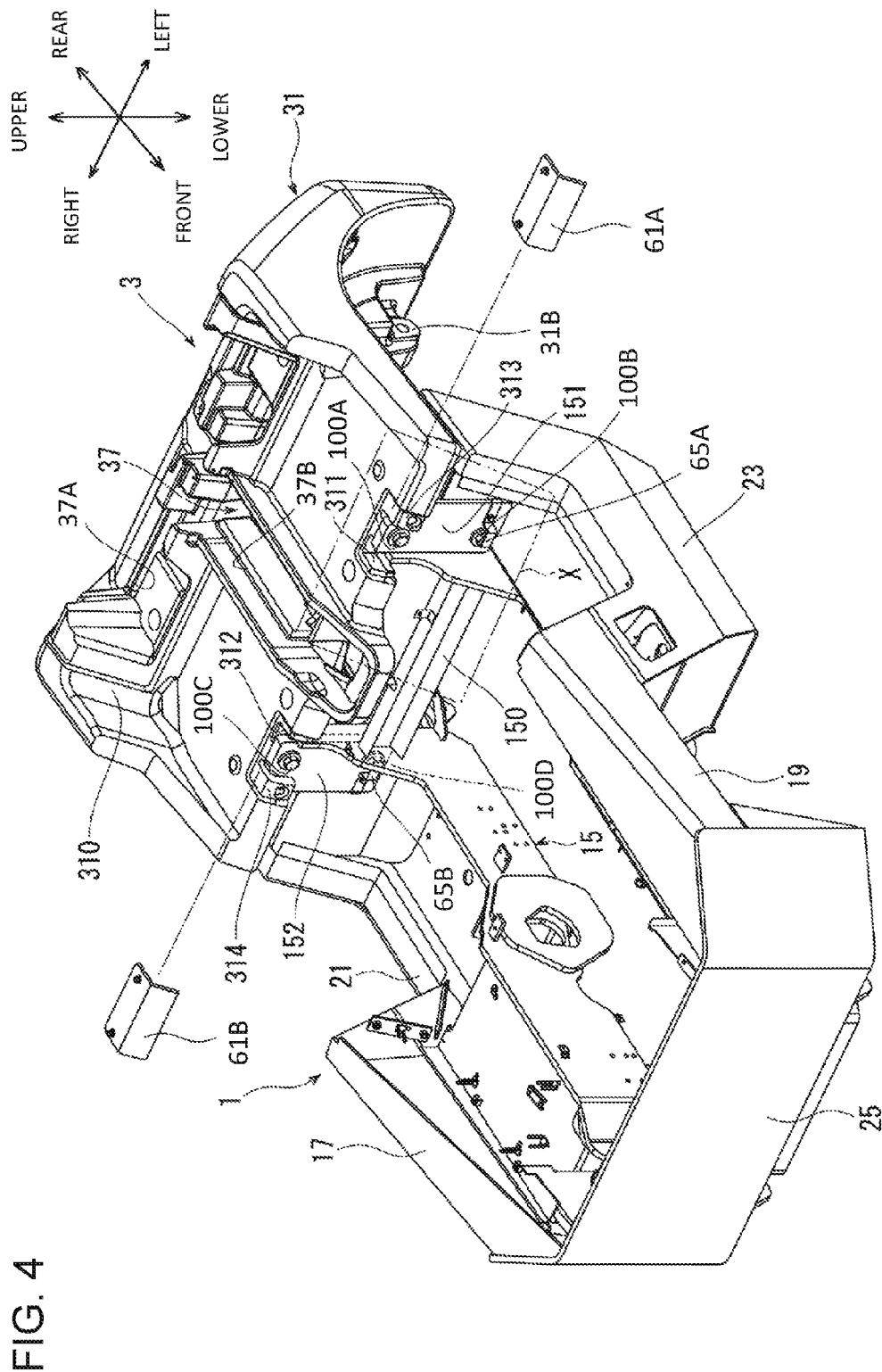
FIG. 4 is a perspective view of the industrial vehicle of FIG. 1, showing a connecting state in which a counterweight is connected to a frame.

As shown in FIG. 4, the vehicle body 1 includes a frame 15, a right fender panel 17, a left fender panel 19, a fuel tank 21, a side panel 23, and the aforementioned front guard 25. As shown in FIG. 1, the vehicle body 1 further includes a hood 27, a center panel 28, a floor panel 29, the aforementioned front wheels 7, an engine (not shown in the drawing), and a transmission (not shown in the drawing).

The frame 15 includes a frame body 150 (FIG. 2), and a left upright wall 151 and a right upright wall 152 (FIG. 4). The left upright wall 151 and the right upright wall 152 correspond to the upright wall of the present invention.

As shown in FIG. 2, the frame body 150 is formed of a plurality of long steel parts connected together and has a frame shape extending in the front and rear direction of the towing tractor. The frame body 150 is disposed at a lower position of the vehicle body 1 and supports the engine and the transmission. The engine may be replaced with an electric motor. For the sake of the description, FIG. 2 shows a simplified shape of the frame body 150 and omits the illustration of the left upright wall 151 and the right upright wall 152.

As shown in FIG. 4, the left upright wall 151 and the right upright wall 152 are formed of flat steel plates. The left upright wall 151 is connected to the left rear part of the frame body 150 and extends to the upper part of the frame body 150. The right upright wall 152 is connected to the right rear part of the frame body 150 and extends to the upper part of the frame body 150. The left upright wall 151 and the right upright wall 152 are symmetrical to each other.

Figure 5:
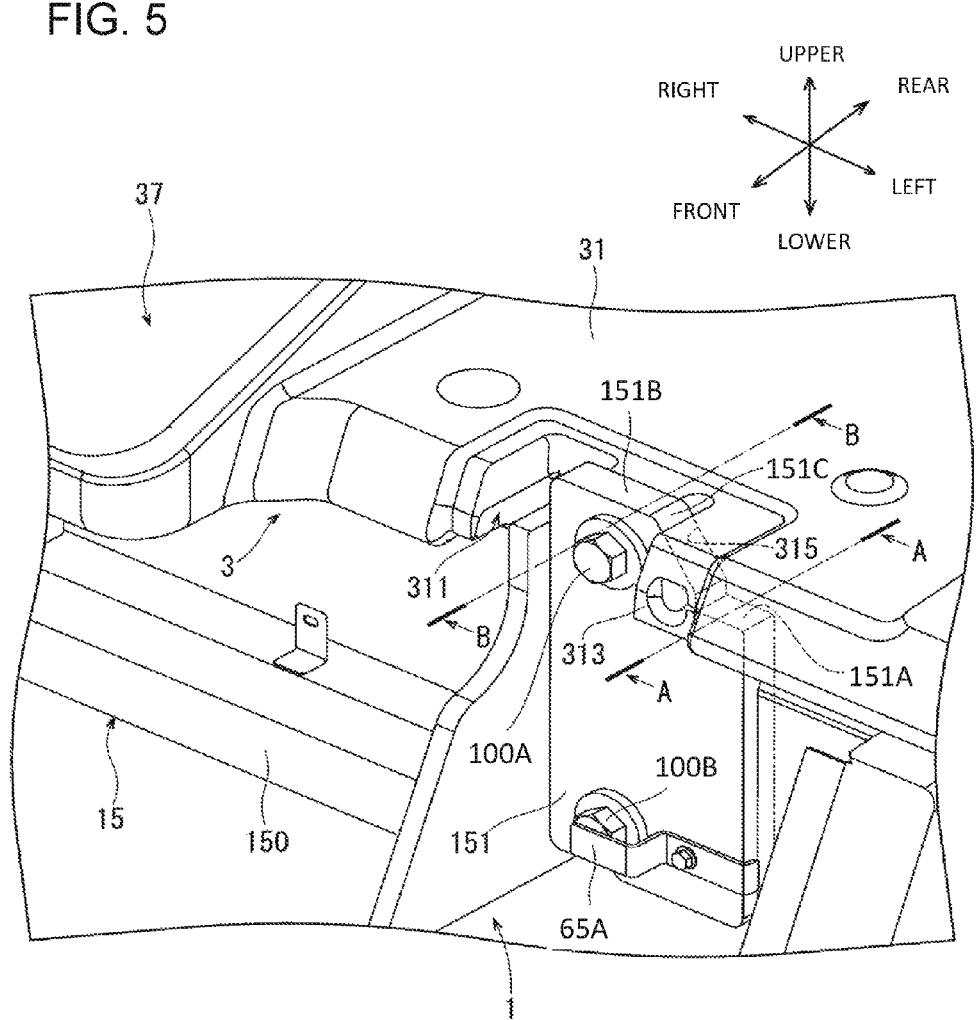
FIG. 5 is a partially enlarged perspective view showing a state in which the counterweight is connected to an upright wall of the industrial vehicle of FIG. 1.

The following will describe the structure based on the left upright wall 151. The region that is surrounded by chain double-dashed line X in FIG. 4 is shown in a larger scale in FIG. 5. As shown in FIG. 5, the left upright wall 151 is generally of a rectangular shape having at the upper part thereof a stepped shape. The left upright wall 151 has a first upper portion 151A located on the left side thereof, a second upper portion 151B located on the right side thereof and at a level higher than the first upper portion 151A, and an inclined portion 151C continuously connecting the first upper portion 151A and the second upper portion 151B. The first upper portion 151A corresponds to the upper surface of the present invention.

Figure 11:
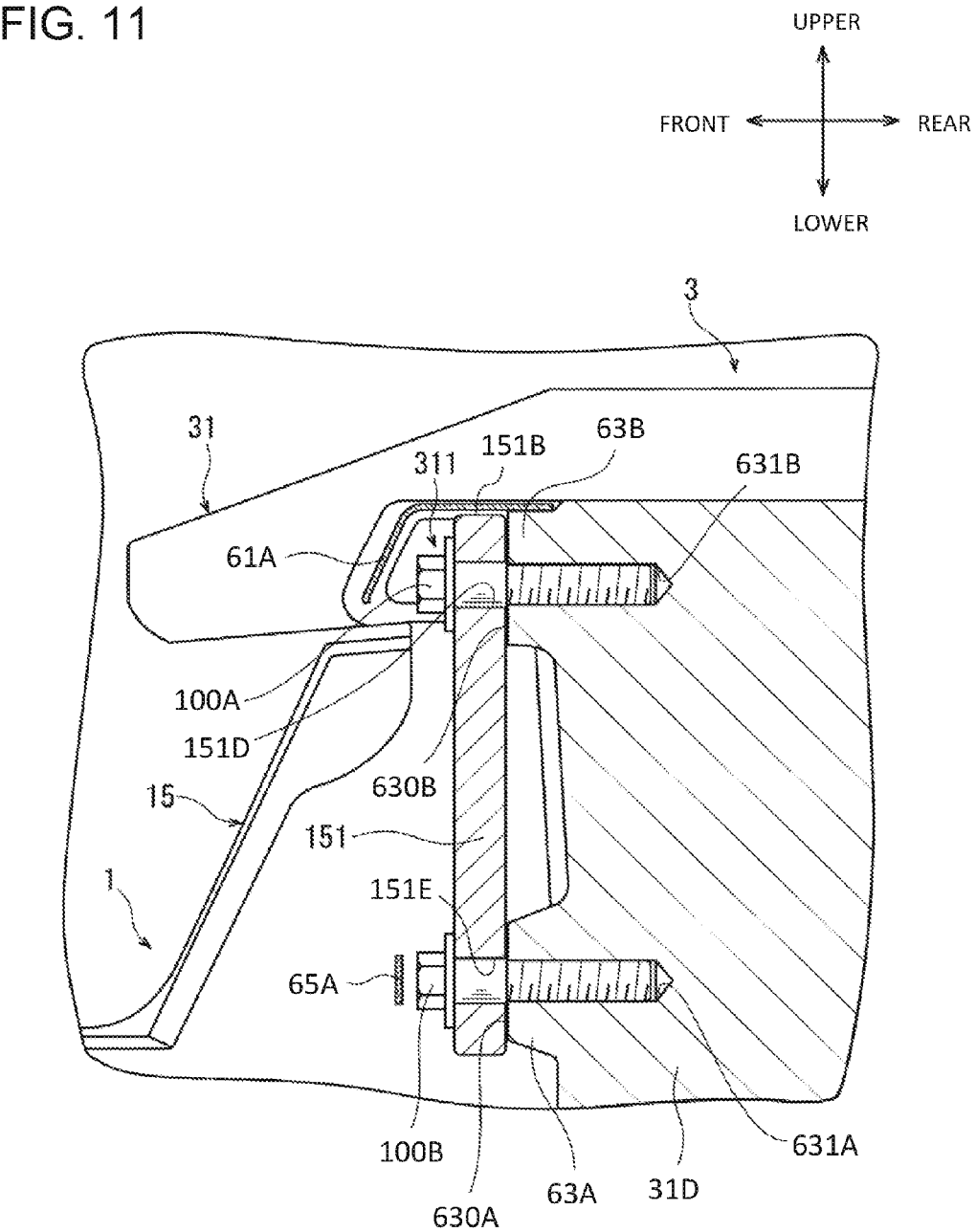
FIG. 11 is a partially enlarged sectional view taken along the line B-B of FIG. 5.

As shown in FIG. 11, the left upright wall 151 has therethrough bolt holes 151D and 151E that extend in the front and rear direction.

As shown in FIG. 2, the right fender panel 17 is mounted to the right front part of the frame body 150 and the left fender panel 19 is mounted to the left front part of the frame body 150, respectively. The fuel tank 21 is mounted to the right part of the frame body 150 and located in the rear part of the right fender panel 17. The side panel 23 is mounted to the left part of the frame body 150 at a position rearward of the left fender panel 19. The front guard 25 is mounted to the frame body 150 at the front end thereof. As shown in FIG. 1, the hood 27 is mounted between the right fender panel 17 and the left fender panel 19. The center panel 28 and the floor panel 29 are mounted between the fuel tank 21 and the side panel 23.

The front wheels 7 are disposed below the left fender panel 19 and the right fender panel 17, respectively, and supported by the frame body 150.

As shown in FIG. 3, the counterweight 3 includes a counterweight body 31, a first cover 33, a second cover 35, a first bolt cover 61A, and a second bolt cover 61B.

Figure 6:
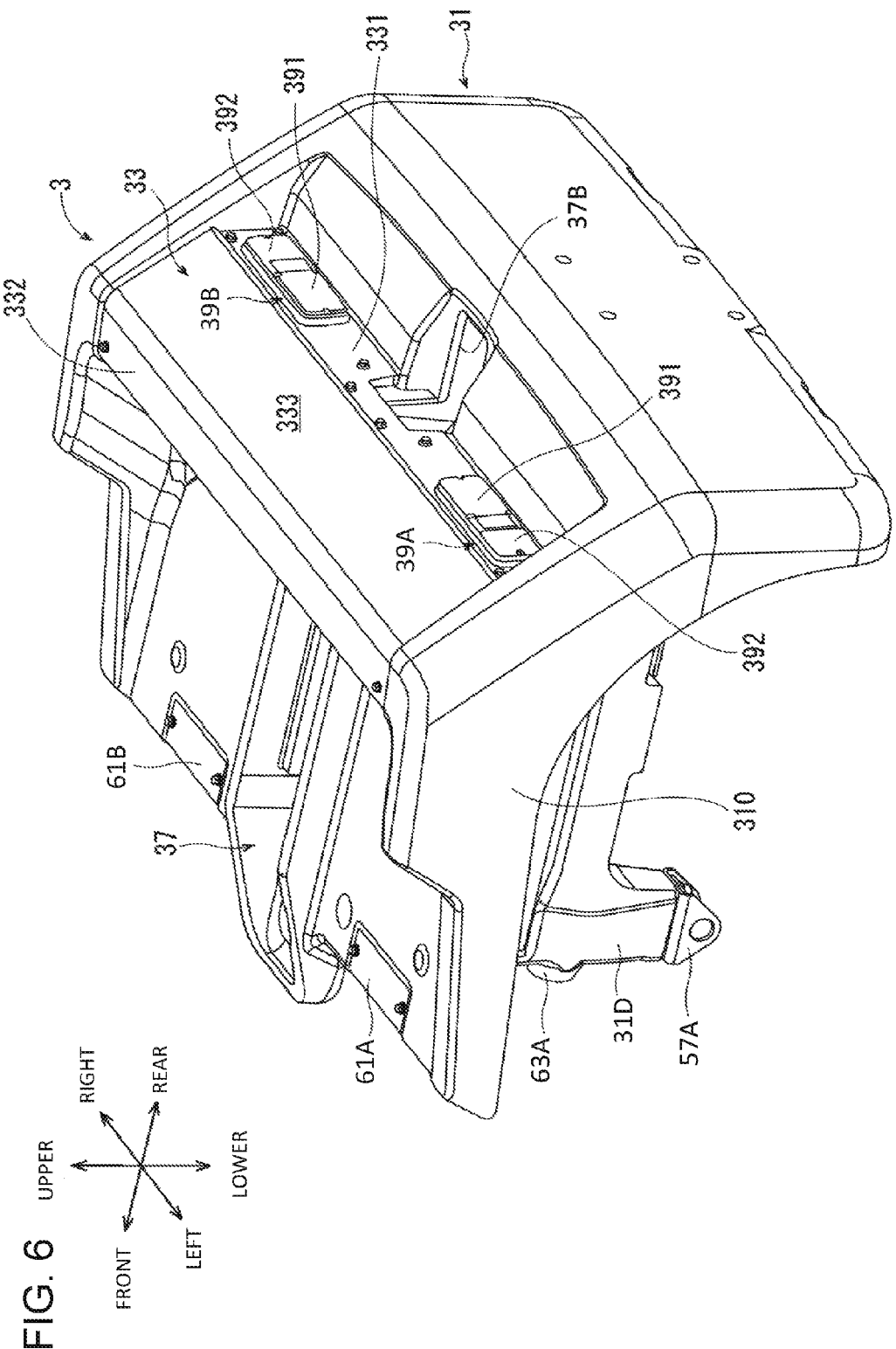
FIG. 6 is a perspective view of the counterweight of the industrial vehicle of FIG. 1.

As shown in FIG. 6, the counterweight body 31 is formed of a single part made by casting. A bank portion 310 is formed in the rear part of the counterweight body 31, extending upward. The rear part of the bank portion 310 is inclined downward and rearward. As shown in FIG. 1, the driver seat 13 is mounted to the front left part of the counterweight body 31. Although not shown in the drawing, a drawbar device is provided at the bottom of the rear end part of the counterweight body 31 to connect the towing tractor with a cargo truck.

As shown in FIG. 4, the counterweight body 31 has therein an opening 37 extending vertically. The opening 37 includes a center portion 37A that extends in width direction in the bank portion 310 and a linear portion 37B that is formed continuously with the center portion 37A and extends straight from the rear end toward the front end of the counterweight body 31. The opening 37 is substantially of a crisscross shape. The shape of the opening 37 may be changed according to design requirement.

A first recessed portion 311 is formed in the left front part of the counterweight body 31. A second recessed portion 312 is formed in the right front part of the counterweight body 31. A first engaging portion 313 is formed on the left side of the first recessed portion 311 at the left front part of the counterweight body 31. A second engaging portion 314 is formed on the right side of the second recessed portion 312 in the right front part of the counterweight body 31. The first and second engaging portions 313, 314 correspond to the engaging member of the present invention.

Figure 7:
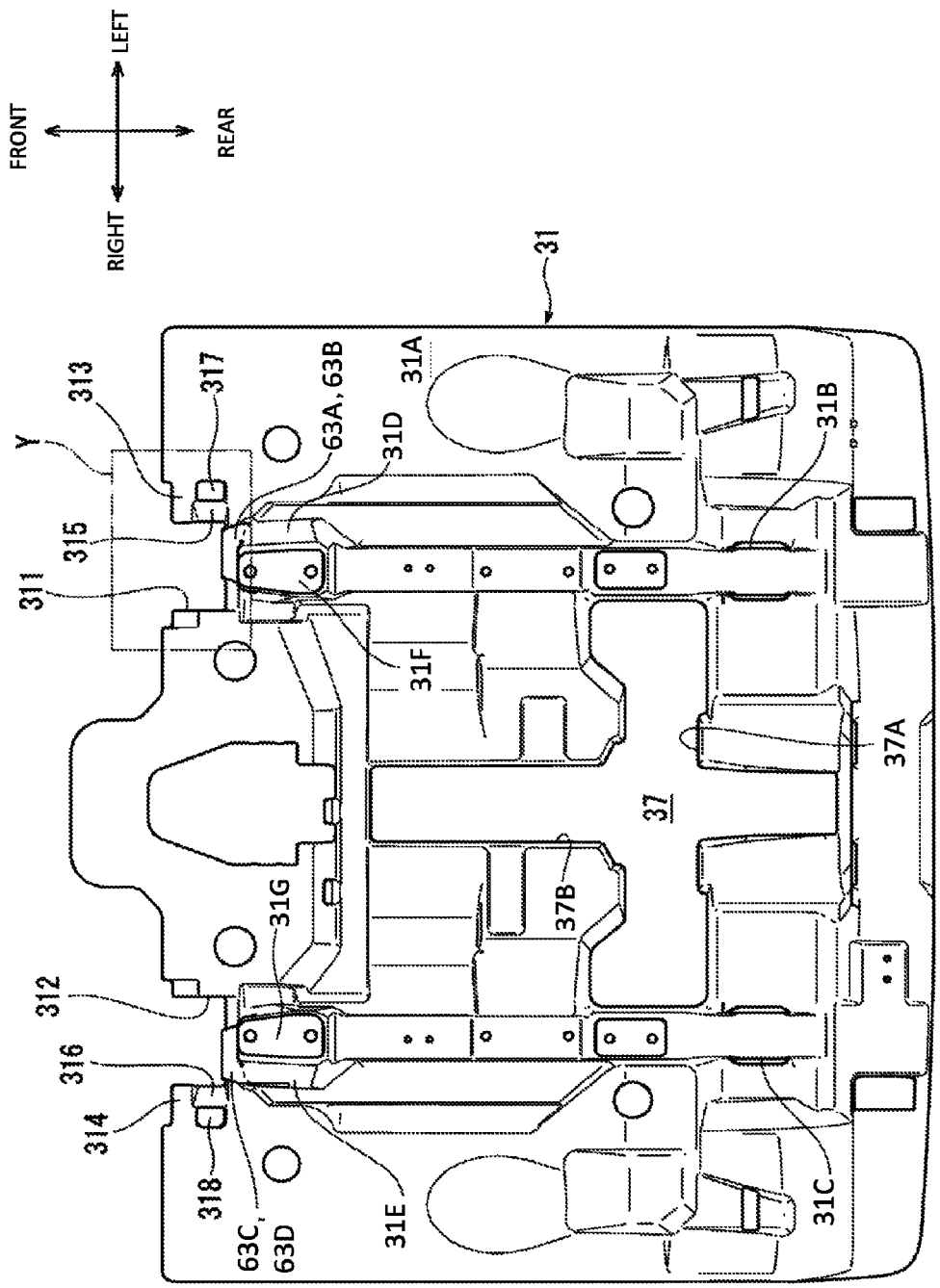
FIG. 7 is a bottom view of the counterweight of the industrial vehicle of FIG. 1.

Referring to FIG. 7 showing a rear surface 31A of the counterweight body 31, the counterweight body 31 has at the front end of the rear surface 31A thereof a first guide recessed portion 315, a second guide recessed portion 316, a first contact portion 317, and a second contact portion 318. The first contact portion 317 and the second contact portion 318 correspond to the contact portion of the present invention.

Figure 8:
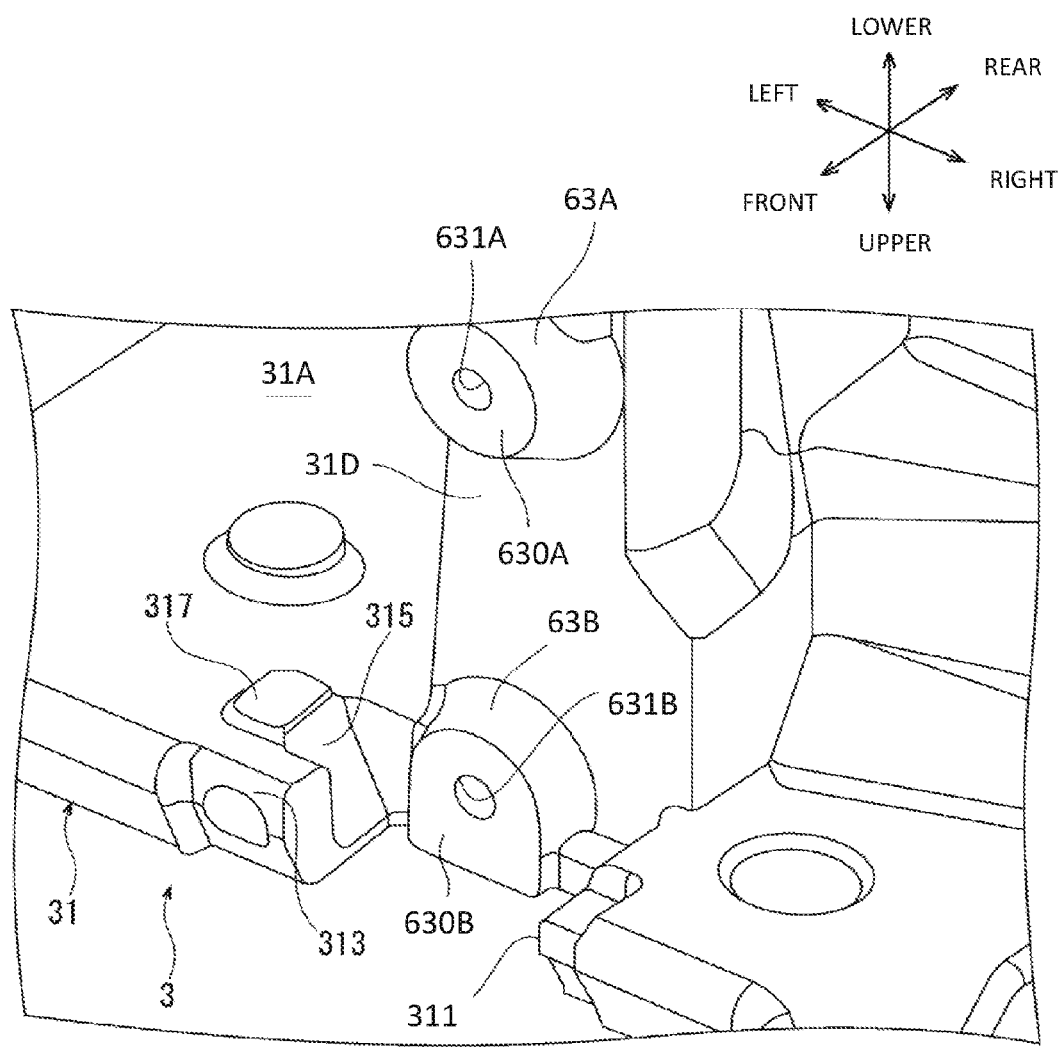
FIG. 8 is a partially enlarged perspective view showing an engaging portion and a contact portion of the industrial vehicle of FIG. 1.

Referring to FIG. 8 showing the region Y in FIG. 7 in an enlarged view, the first guide recessed portion 315 is located rearward of the first engaging portion 313. The first guide recessed portion 315 is formed in the rear surface 31A of the counterweight body 31 along the shape of the inclined portion 151C of the left upright wall 151. Specifically, the first guide recessed portion 315 is of a shape inclined leftward from the center part toward the rear surface 31A of the counterweight body 31.

The first contact portion 317 is formed in a substantially rectangular shape and located on the left side of the first guide recessed portion 315. That is, the first contact portion 317 is formed on the rear surface 31A of the counterweight body 31 at a position that is different from the first and the second engaging portions 313, 314. The first contact portion 317 is formed extending downward from the rear surface 31A of the counterweight body 31.

As shown in FIG. 7, the second guide recessed portion 316 is located rearward behind the second engaging portion 314. The second guide recessed portion 316 has a symmetrical shape to the first guide recessed portion 315 and is inclined rightward from the center toward the rear surface 31A of the counterweight body 31. As with the first contact portion 317, the second contact portion 318 has a substantially rectangular shape. The second contact portion 318 is located on the right side of the second guide recessed portion 316. That is, the second contact portion 318 is also formed on the rear surface 31A of the counterweight body 31 at a position that is different from the first and the second engaging portion 313, 314. The second contact portion 318 is also formed extending downward from the rear surface 31A toward the lower side of the counterweight body 31.

A first mounting portion 31B is formed at a lower position on the rear left side of the counterweight body 31. A second mounting portion 31C is formed at a lower position on the rear right side of the counterweight body 31. As shown in FIG. 3, a left leg portion 31D is formed at a lower position on the front left side of the counterweight body 31 and extends downward. A right leg portion 31E is formed at a lower position on the front right side of the counterweight body 31. As shown in FIG. 3, a bracket 57A is mounted to a bottom surface 31F of the left leg portion 31D also shown in FIG. 7 by a bolt not shown and a bracket 57B is mounted to a bottom surface 31G of the right leg portion 31E also shown in FIG. 7 by a bolt not shown.

As shown in FIG. 8, projections 63A and 63B are formed projecting from the left leg portion 31D. The projection 63A is located substantially at the center of the left leg portion 31D in the upper and lower direction thereof. The projection 63B is located at a position adjacent to the upper end of the left leg portion 31D and the first recessed portion 311. A flat contact portion 630A is formed at the front end of the projection 63A. A flat contact portion 630B is formed at the front end of the projection 63B. As shown in FIG. 11, a threaded bolt hole 631A is formed in the projection 63A and extends in the front and rear direction. A threaded bolt hole 631B is formed in the projection 63B and extends in the front and rear direction.

As shown in FIG. 7, projections 63C and 63D are formed projecting from the right leg portion 31E. The projection 63C has the same configuration as the projection 63A. The projection 63D has the same configuration as the projection 63B.

As shown in FIG. 6, the first cover 33 is formed of a pressed metal plate. The first cover 33 has a vertical portion 331 that is located on the lower side of the first cover 33 and extends substantially vertically, a horizontal portion 332 that is located on the upper side of the first cover 33 and extends horizontally in the front and rear direction of the first cover 33, a connecting portion 333 that is continuously connected to the vertical portion 331 and the horizontal portion 332. The connecting portion 333 is inclined from the horizontal portion 332 downward toward the vertical portion 331 along the rear shape of the bank portion 310.

Tail lamps 39A and 39B are mounted on the left and right sides of the vertical portion 331, respectively. Each of the tail lamps 39A, 39B is a combination lamp that combines a brake lamp 391 and a direction indicator lamp 392.

The second cover 35 shown in FIG. 3 is also formed of a pressed metal plate. The second cover 35 is formed flat and extends in the left and right direction. The first and the second covers 33, 35 may be changed according to design requirement. Additionally, the first and the second covers 33, 35 may be made of resin.

As shown in FIG. 6, the first cover 33 is mounted to the bank portion 310 at the rear thereof by a plurality of bolts. As shown in FIG. 1, the second cover 35 is mounted to the bank portion 310 at the front thereof by a plurality of bolts not shown. Thus, the first and the second covers 33, 35 form the outer shape of the bank portion 310 and cover the center portion 37A of the opening 37. With the first and the second covers 33, 35 mounted to the counterweight body 31, the rear end of the linear portion 37B of the opening 37 is exposed outside, as shown in FIG. 6. With the first cover 33 mounted at the rear side of the bank portion 310, the tail lamps 39A, 39B are disposed at the rear of the counterweight 3.

The aforementioned first bolt cover 61A is mounted to the left front end of the counterweight body 31. Thus, the first bolt cover 61A covers the first recessed portion 311, the first engaging portion 313, and a bolt 100A which will be described later. The second bolt cover 61B is mounted to the right front end of the counterweight body 31. Thus, the second bolt cover 61B covers the second recessed portion 312, the second engaging portion 314, and a bolt 100C which will be described later. The first and the second bolt covers 61A, 61B correspond to the cover according to the present invention.

As shown in FIG. 3, the drive device 5 includes a rear axle 51, leaf spring suspensions 53A, 53B that are respectively provided on the left and right sides of the rear axle 51 as a shock absorber. A shock absorbing member may be used for the leaf spring suspensions 53A, 53B.

The rear axle 51 includes a differential gear not shown that is accommodated in an axle case 510, an axle shaft, and drum brakes 511A, 511B and hubs 512A, 512B that are provided on the left and right sides of an axle shaft, respectively.

The rear axle 51 is connected to the engine through the transmission to transmit drive force to the rear wheels 9 (FIG. 1) that are mounted to the rear axle 51 through the respective hubs 512A, 512B. Thus, the rear axle 51 drives the rear wheels 9 so that the towing tractor travels.

Figure 9:
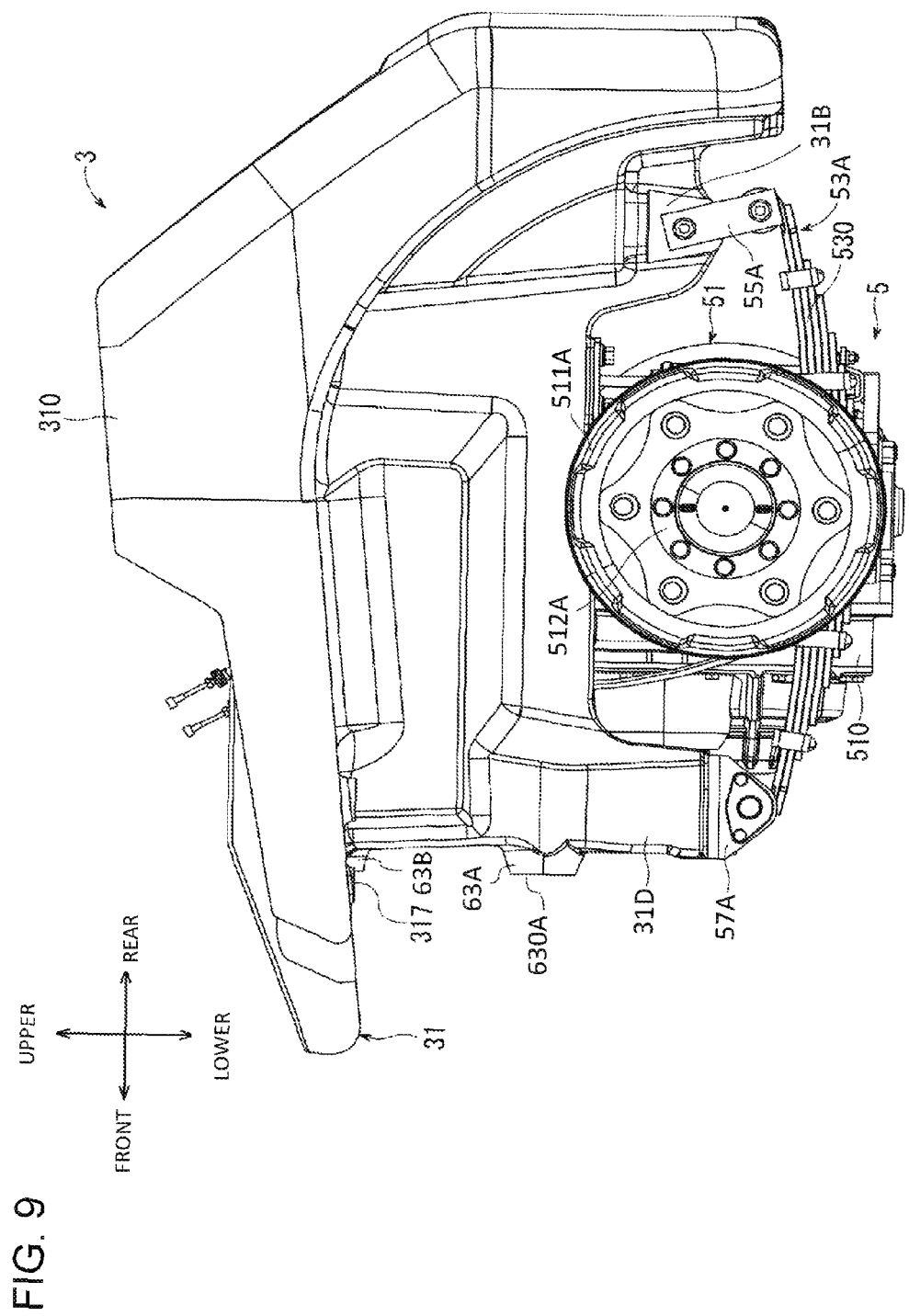
FIG. 9 is a left side view showing a mounted state in which the counterweight is connected to a drive device of the industrial vehicle of FIG. 1.

As shown in FIG. 9, each of the leaf spring suspension 53A, 53B is made of laminated leaf springs 530 and extends in the front and rear direction. The leaf spring suspension 53A is mounted at the rear end thereof to the first mounting portion 31B of the counterweight body 31 through the bracket 55A and at the front end thereof to the left leg portion 31D of the counterweight body 31 through the bracket 57A. As shown in FIG. 3, the leaf spring suspension 53B is mounted at the rear end thereof to the second mounting portion 31C (FIG. 7) of the counterweight body 31 through the bracket 55B and at the front end thereof to the right leg portion 31E of the counterweight body 31 through the bracket 57B. Thus, the leaf spring suspensions 53A, 53B are mounted to the left and right lower parts of the counterweight body 31 and the drive device 5 is directly mounted to the counterweight body 31 at lower parts thereof through the leaf spring suspensions 53A, 53B.

The controller 11 shown in FIG. 1 includes an instrument panel 11A, a steering wheel 11B, a drawbar lever 11C, and an operation lever unit 11D (FIG. 3). As shown in FIG. 1, the instrument panel 11A and the steering wheel 11B are mounted to the vehicle body 1. The drawbar lever 11C is mounted to the rear part of the counterweight body 31 and connected to the drawbar device so as to control the drawbar device. As shown in FIG. 3, the operation lever unit 11D is mounted to the counterweight body 31 and at a position on the right side of the driver seat 13. The operation lever unit 11D is mounted so as to cover the front end of the linear portion 37B of the opening 37.

As shown in FIG. 4, the counterweight 3 of the towing tractor according to the present embodiment is connected to the rear part of the frame 15 by fastening the counterweight body 31 to the left upright wall 151 and the right upright wall 152 by the bolts 100A, 100B and the bolts 100C, 100D, respectively.

Figure 10:
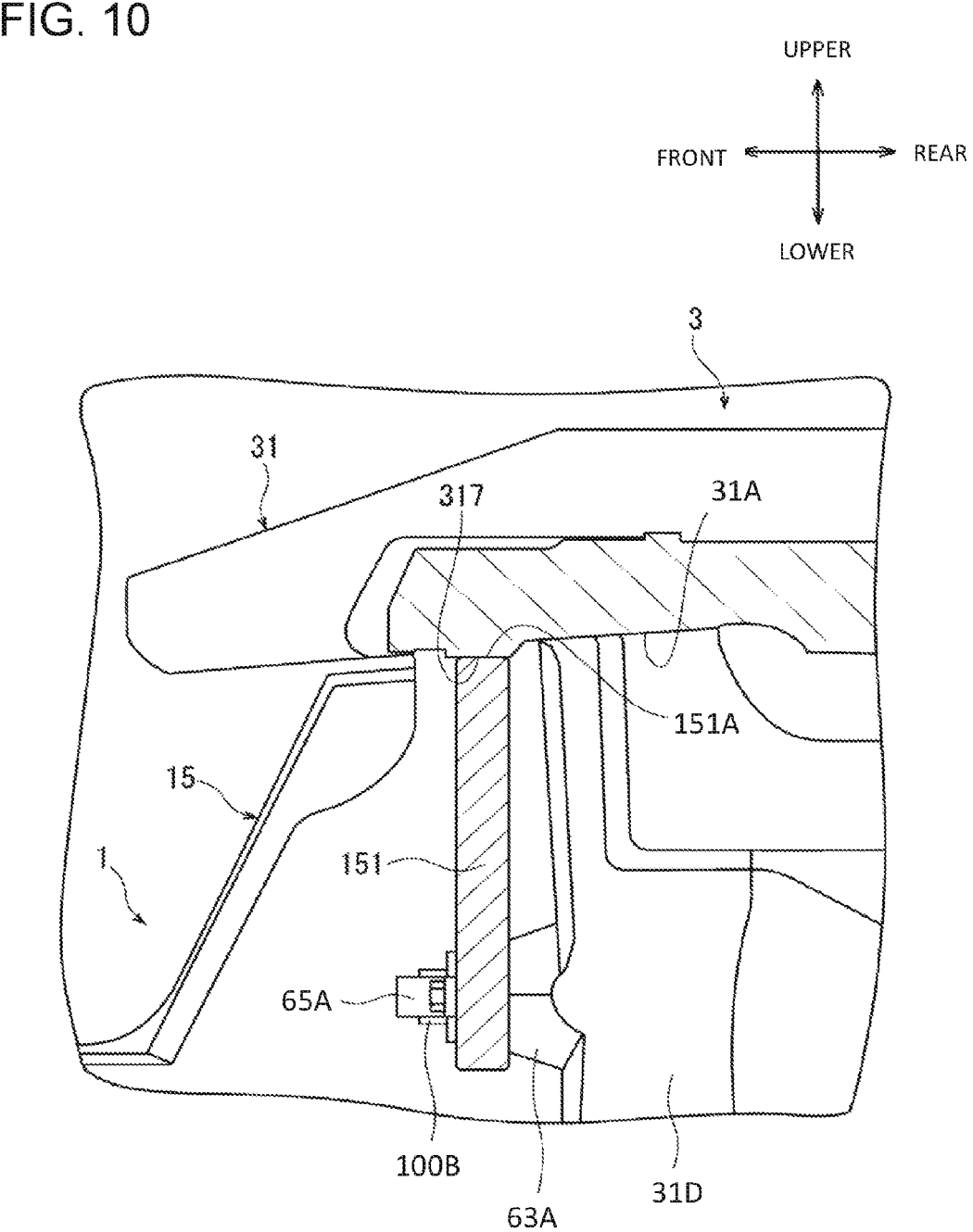
FIG. 10 is a partially enlarged sectional view taken along the line A-A of FIG. 5.

The following will describe a procedure for fastening the counterweight body 31 to the left upright wall 151 and the right upright wall 152. In fastening the counterweight body 31 to the left upright wall 151 and the right upright wall 152, the counterweight body 31 is moved close to the left upright wall 151 and the right upright wall 152 by using any suitable means such as crane or jig not shown. With the left upright wall 151 disposed so that its inclined portion 151C is positioned in the first guide recessed portion 315 on the left side of the counterweight body 31 as shown in FIG. 5, the first contact portion 317 is in contact with the first upper portion 151A of the left upright wall 151 as shown in FIG. 10. Thus, the first engaging portion 313 is engaged with the left upright wall 151 in such a way that the first engaging portion 313 covers a part of the upper end of the left upright wall 151 at a position adjacent to the inclined portion 151C, as shown in FIG. 5. As a result, the left upright wall 151 is positioned properly relative to the counterweight body 31.

Similarly, with the left upright wall 151 disposed so that its inclined portion 151C is positioned in the second guide recessed portion 316 on the right side of the counterweight body 31, the second contact portion 318 is in contact with the first upper portion 151A of the right upright wall 152. Thus, the second engaging portion 314 is engaging with the right upright wall 152 in such a way that the second engaging portion 314 covers a part of the upper end of the right upright wall 152, as shown in FIG. 4. As a result, the right upright wall 152 is positioned properly relative to the counterweight body 31.

As described above, since the left upright wall 151 and the right upright wall 152 are positioned properly relative to the counterweight body 31, the right side of the left upright wall 151, or the part adjacent to the second upper portion 151B is located in the first recessed portion 311 as shown in FIG.

5. Furthermore, as shown in FIG. 11, the contact portions 630A, 630B of the respective projections 63A, 63B are set in contact with the left upright wall 151. The same is true of the right upright wall 152.

Next, as shown in FIG. 11, the bolt 100A is inserted through the bolt hole 151D of the left upright wall 151 and screwed into the threaded bolt hole 631B of the projection 63B, and the bolt 100B is inserted through the bolt hole 151E of the left upright wall 151 and screwed into the threaded bolt hole 631A of the left leg portion 31D. By fastening the left upright wall 151 to the projection 63B and the projection 63A of the left leg portion 31D by the respective bolts 100A, 100B, the left upright wall 151 is fastened to the counterweight body 31. Then, a retainer plate 65A is mounted to the left upright wall 151, as shown in FIG. 5. Thus, the retainer plate 65A limits the axial movement of the bolt 100B, so that the bolt 100B is prevented from falling off from the left upright wall 151 and the left leg portion 31D.

Similarly, the right upright wall 152 is fastened to the right leg portion 31E by the bolts 100C, 100D thereby fastening the right upright wall 152 to the counterweight body 31, as shown in FIG. 4. A retainer plate 65B is mounted to the right upright wall 152 to limit the axial movement of the bolt 100D, so that the bolt 100D is prevented from falling off from the right upright wall 152 and the right leg portion 31E.

Next, the aforementioned first and the second bolt covers 61A, 61B are mounted to the counterweight body 31. Thus, the first recessed portion 311, the first engaging portion 313, and the bolt 100A are covered and concealed by the first bolt cover 61A. The second recessed portion 312, the second engaging portion 314, and the bolt 100C are covered and concealed by the second bolt cover 61B.

As shown in FIG. 11, since the first bolt cover 61A is mounted to the counterweight body 31, the first bolt cover 61A is located forward of the bolt 100A. If the bolt 100A should be moved in the axial direction for the distance that is greater than a limit value, the bolt 100A is brought into contact with the first bolt cover 61A, so that the axial movement is limited. Similarly, the axial movement of the bolt 100C is limited by the second bolt cover 61B. Therefore, the bolts 100A, 100C are prevented from falling off from the left upright wall 151 and the left leg portion 31D and from the right upright wall 152 and the right leg portion 31E, respectively. This completes the procedure for fastening the left and right upright walls 151, 152 to the counterweight body 31 and the counterweight 3 is connected to the rear part of the frame 15.

In the towing tractor according to the present embodiment described above, in which the first and the second engaging portions 313, 314 of the counterweight body 31 are engaged with the left and right upright walls 151, 152, respectively, the left and right upright walls 151, 152 are positioned correctly relative to the counterweight body 31. Accordingly, the structure in which the left and right upright walls 151, 152 are fastened to the counterweight body 31 by the bolts 100A, 100B, 100C, 100D facilitates the positioning.

The structure of the towing tractor according to the present embodiment in which the first and the second contact portions 317, 318 are in contact with the respective first upper portions 151A of the left and right upright walls 151, 152 facilitates the positioning of the left and right upright walls 151, 152 relative to the counterweight body 31. Each of the first and the second contact portions 317, 318 has a shape extending downward from the rear surface 31A of the counterweight body 31, or a shape extending toward the first upper portions 151A of the left and right upright walls 151, 152. Therefore, the first and the second contact portions 317, 318 may be made to be in contact easily with the respective first upper portions 151A.

In this towing tractor according to the present embodiment in which the first and the second engaging portions 313, 314 are engaged with the left and right upright walls 151, 152, respectively, the left and right upright walls 151, 152 are prevented from being displaced relative to the counterweight body 31. Therefore, after once the first and the second engaging portions 313, 314 have been engaged with the left and right upright walls 151, 152, respectively, a jig used to prevent the displacement may be dispensed with.

The towing tractor according to the present embodiment has an improved productivity and the manufacturing cost can be lowered, accordingly.

In the towing tractor according to the present embodiment, the provision of the first bolt cover 61A that conceals the first recessed portion 311, the first engaging portion 313, and the bolt 100A and of the second bolt cover 61B that conceals the second recessed portion 312, the second engaging portion 314, and the bolt 100C helps to improve the appearance of the towing tractor. The first and the second bolt covers 61A, 61B can also serve to limit the axial movement of the bolts 100A, 100C, respectively. Therefore, the towing tractor according to the present embodiment that can dispense with a part such as the retainer plates 65A, 65B can reduce the number of the parts.

The present invention is not limited to the above-described embodiment, but may be practiced variously as exemplified below within the scope of the invention.

Although a towing tractor has been described as the industrial vehicle in the above embodiment, the industrial vehicle may include a forklift truck.

The frame body 150 may be provided with mountings to which the respective leaf spring suspensions 53A, 53B are mounted and the drive device 5 may be mounted to the rear part of the frame body 150.

The counterweight body 31 may be formed of a combination of parts.

The present invention is applicable to an industrial vehicle such as a towing tractor and a forklift truck.

What is claimed is:

1. An industrial vehicle comprising:
   a frame; and
   a counterweight connected to a rear part of the frame, wherein the frame includes a frame body and an upright wall that extends upward from the frame body, wherein the counterweight is fastened to the upright wall by a bolt, and wherein the counterweight has an engaging portion to cover part of the upright wall and engage with the upright wall, and
   the counterweight has a cover to cover the bolt and limit the axial movement of the bolt such that the cover is located forward of the bolt, when viewed from a rear end of the industrial vehicle.

2. The industrial vehicle according to claim 1, wherein the counterweight has a contact portion that extends toward the upright wall at a position that is different from the engaging portion and is in contact with an upper surface of the upright wall.

* * * * *